Figure 1:
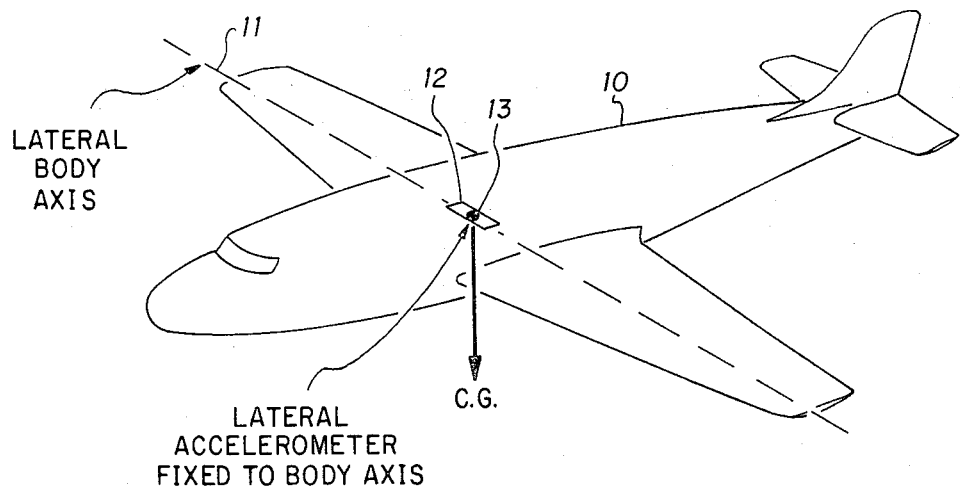

United States Patent [19]
Schultz et al.

[11] 3,761,691
[45] Sept. 25, 1973

[54] RUNWAY ALIGNMENT SYSTEM UTILIZING A LATERAL ACCELERATION SIGNAL

[75] Inventors: Elmer L. Schultz, Marion, Iowa; Edwin R. Hattendorf, Mission Viejo, Calif.

[73] Assignee: Collins Radio Company, Dallas, Tex.

[22] Filed: Nov. 24, 1972

[21] Appl. No.: 309,307

[52] U.S. Cl....... 235/150.22, 235/150.26, 244/77 G
[51] Int. Cl............................................. G06g 7/78
[58] Field of Search................. 235/150.22, 150.26, 235/150.27; 244/77 R, 77 A, 77 B, 77 G; 343/108, 107, 5 LS, 6 C; 73/178 T

[56] References Cited
UNITED STATES PATENTS

| | | | |
|---|---|---|---|
| 2,961,202 | 11/1960 | Summerlin | 244/77 G |
| 2,984,435 | 5/1961 | Faith et al. | 244/77 G X |
| 3,057,584 | 10/1962 | Bretoi | 235/150.26 X |
| 3,136,502 | 6/1964 | Auld, Jr. et al. | 244/77 A |
| 3,449,713 | 6/1969 | Kaiser | 235/150.22 X |

*Primary Examiner*—Joseph F. Ruggiero
*Attorney*—Richard W. Anderson et al.

[57] ABSTRACT

A landing control system utilizing a lateral acceleration signal in formulation of roll steering command such that a decrab maneuver effects a "wing down into the wind" forward slip maneuver, maintaining runway alignment.

8 Claims, 2 Drawing Figures

RUNWAY ALIGNMENT SYSTEM UTILIZING A LATERAL ACCELERATION SIGNAL

This invention relates generally to aircraft control and more particularly to an improvement in aircraft roll axis command signal computation by means of which the landing performance of an aircraft may be improved.

Present control systems operate in the terminal phases of an aircraft landing to align the flight path of the aircraft with the runway center line by means of combining localizer radio deviation signals and bank attitude signals to formulate a roll steering command. In these systems should a cross-wind be present, the roll axis steering command signal computation includes means to wash out the steady state component of the aircraft heading such that the aircraft automatically crabs into the wind by sufficient amount to maintain a predetermined flight path. In the case of an aircraft landing procedure, the aircraft is maintained on a flight path coincident with the runway center line but may be crabbed a number of degrees into the wind.

Landing techniques based on such control systems then generally incorporate a means to initiate a decrab maneuver just prior to touchdown by means of an automatic or manual yaw axis maneuver such that the crab angle is removed and damage to the aircraft landing gear is prevented.

The present invention relates to an improvement in landing touchdown technique by providing a means of smoothly and rapidly making a transition from a heading crab condition of flight to a forward slip condition and still maintain cross wind compensation.

The object of the present invention is accordingly the provision of an improvement in aircraft roll axis command signals computations whereby transition from a heading crab to a forward slip condition of flight is provided and cross-wind compensation is maintained.

The present invention is featured in the inclusion of a lateral accelerometer signal in the aircraft roll axis computations to provide a quantity effective in roll steering computation to command "wing down into the wind" in an appropriate fashion such that the wind is prevented from blowing the aircraft off-course, and the aircraft terminates the landing with a forward slip maneuver.

Figure 2:
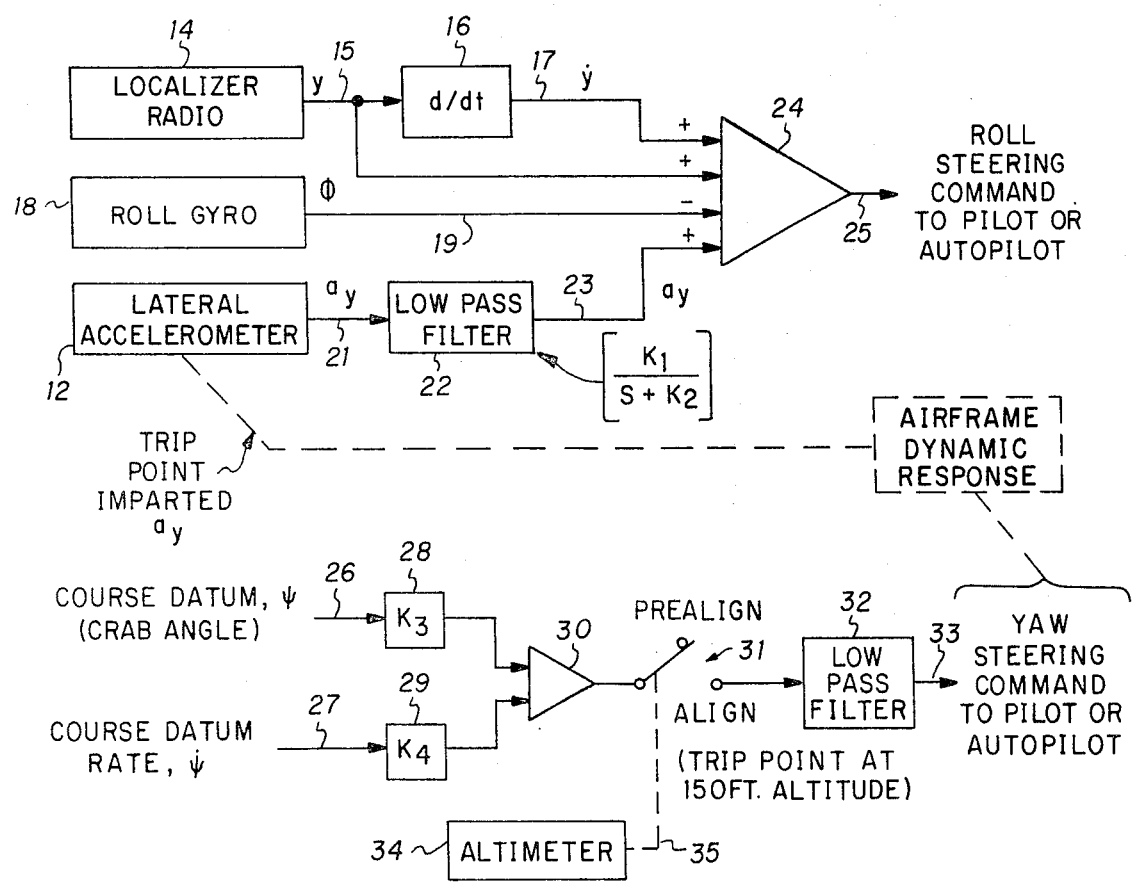

These and other objects and features of the present invention will become apparent upon reading the following description in conjunction with the accompanying drawings in which:

FIG. 1 is a diagrammatic representation of an aircraft together with lateral accelerometer installation as employed in the present invention, and FIG. 2 is a functional block diagram of a simplified roll and yaw axes control system with automatic flight control apparatus including forward slip compensation computation means in accordance with the present invention.

With the advent of state of the art large aircraft, the problems of inertia associated with the huge mass of the aircraft, the stringent requirements placed on aircraft undercarriage design, and the problems of passenger comfort during the landing, collectively define a forward slip maneuver in landing under cross-wind conditions as being preferable over a yawing maneuver just prior to touchdown in order that the longitudinal axis of the aircraft be aligned with the flight path of the aircraft to prevent damage to the aircraft undercarriage upon touchdown.

A forward slip maneuver is defined as a movement of an aircraft in a yawed attitude and following its original forward direction of flight. It has been found that the forward slip maneuver initiated at, for example, an altitude of 150 feet during the landing maneuver may command the aircraft into a "wing down into the wind" attitude such that the aircraft flight path is unaltered, with the preferred runway alignment maintained.

Thus upon touchdown, and by a safe margin preceding touchdown, the longitudinal aircraft axis is aligned with the runway. Upon touchdown, damage to the undercarriage which would most certainly be inflicted to a massive aircraft landed in a crabbed condition, would be prevented. Further, due to the inertia of large aircraft the assurance of a touchdown without undercarriage damage is greater in a forward slip maneuver than with a violent "last minute" decrab maneuver effected by kicking the rudder.

The present invention provides a system for effecting a forward slip maneuver with the maintenance of cross-wind compensation by including in aircraft roll axis command signal computations a lateral acceleration signal.

With reference to FIG. 1 an aircraft 10 is depicted with a lateral body axis 11 passing through the center of gravity 13 of the craft. A lateral accelerometer 12 is fixed to the lateral body axis 11 at the center of gravity 13.

The present invention stems from a consideration of the basic side-force equation of motion for an aircraft from which lateral acceleration $a_y$ can be expressed as follows:

$$a_y = \dot{W} + V(\dot{\beta} + \dot{\psi} + \alpha_o \dot{\Phi}) - g\Phi \tag{1}$$

where;
$\dot{W}$ is wind rate
$V$ is aircraft velocity
$\dot{\beta}$ is side slip rate
$\dot{\psi}$ is turning rate
$\alpha_o$ is angle of attack
$\dot{\Phi}$ is roll rate
$g$ is gravitational constant
$\Phi$ is roll angle With reference to equation (1) it may be noted that, in the steady state condition, all of the rate terms are zero, such that the lateral acceleration signal is equated to the term $g\Phi$. Thus the remaining $g\Phi$ term, appropriately scaled and phased, is seen to be the quantity required in roll steering computations to command "wing down into the wind" in an appropriate manner to prevent the wind from blowing the aircraft off course during a forward slip maneuver.

It may further be seen with reference to equation (1) that a decided advantage is realized from using the lateral acceleration signal for this purpose since, in the steady state forward slip, the lateral accelerometer output is independent of airspeed.

FIG. 2 represents a simplified block diagram of a roll steering command signal computation including a lateral accelerometer signal. With reference to FIG. 2, a roll steering command signal 25 is formulated from appropriate mixing, in a mixing device 24, of a displacement signal 15 which might stem from a localizer radio 14 together with a rate of change of the displacement signal, and a roll or bank attitude signal which would correspond to position feedback in a conventional servo control system. Thus a localizer radio 14 supplies a signal 15 for direct application to the mixing device 24. The signal 15 might be applied through a differentiating network 16 to provide a signal 17 corresponding to the rate of change of the displacement signal 15. A roll gyro supplies a bank attitude signal 19 to the mixing device 24.

In accordance with the present invention a further signal is supplied to the mixing device 24 in the form of low-passed lateral acceleration. Accordingly a lateral accelerometer 12, affixed to the lateral body axis of the aircraft at the center of gravity of the aircraft, develops a lateral acceleration signal 21 which is applied through a low-pass filter 22 as a further input 23 to the mixing means 24.

In the steady state condition, the output from lateral accelerometer 12 is zero, inferring an on-course approach to the runway. FIG. 2 further illustrates provision for incorporation of a decrab maneuver which, at a predetermined altitude (i.e. 150 feet), may be initiated either automatically or be pilot induced. Accordingly, the system of FIG. 2 includes a source of course datum signal 26 being applied through a gain means 28 where it is mixed in a further mixing means 30 with a course datum rate signal 27 as applied through a gain means 29. The course datum signal, in the steady state condition and with the aircraft aligned with the runway, represents the crab angle of the aircraft with respect to the runway alignment reference. The course datum signal conventionally represents the difference between a predetermined or preselected course (i.e., the localizer course) and the aircraft heading being experienced. Prior to the predetermined altitude at which the decrab maneuver is to be effected in accordance with the present invention, the output from mixing means 30 is not effective in controlling the aircraft. The output from mixing means 30 is seen to be applied to a mode switching means 31 which, in the prealign position illustrated, does not apply the course datum signal mixed with course datum rate for aircraft yaw axis control. However, upon a predetermined altitude being experienced (for example 150 feet) the output 35 from altimeter 34 might place mode switch 31 in the align position so as to apply the course datum signal and course datum rate mix through a further low pass filter 32 to provide an output 33 for puposes of yaw steering command. Again the yaw steering command signal may be responded to manually by a pilot to effect a decrab maneuver to wash out the course datum signal, or to an autopilot to automatically effect the decrab maneuver. FIG. 2 then illustrates that control response to the decrab maneuver commanded by the yaw steering command output 33 from filter 32 effects an airframe dynamic response which imparts a lateral acceleration to the airframe. Lateral accelerometer 12 then produces a lateral acceleration output signal 21 for application to the roll steering command formulation circuitry within mixing means 24. Thus, at a predetermined altitude, a decrab maneuver is effected either manually or automatically in response to the course datum signal existing at this time, and in reponse to the decrab maneuver, lateral accelerometer 12 develops an output signal 21 which is combined in proper sense with the radio and roll gyro mix to effect a forward slip maneuver with wing down into the wind such that the on-course (runway alignment) condition is maintained and the aircraft is prevented from being blown off course by the wind.

FIG. 2 thus represents a basic embodiment of means for initiating a forward slip maneuver with cross wind compensation, it being understood that the lateral accelerometer acceleration signal is applied to the mixer means 24 in a steady state condition (inferring an on-course condition with no change in aircraft heading) and commands a wing down maneuver appropriate to prevent the wind from blowing the aircraft off the runway centerline.

FIG. 2 illustrates low pass filter 22 as having a transfer function of $(K_1/S + K_2)$, it being realized that the filter 22 might incorporate appropriate scaling and phasing such that the remaining term in equation (1) corresponding to $g\Phi$, under steady state conditions, commands the appropriate "wing down into the wind" roll maneuver in response to which the forward slip maneuver with cross-wind compensation is effected.

Although the present invention has been described with respect to a particular embodiment thereof, it is not to be so limited that changes might be made therein which fall within the scope of the invention as defined in the appended claims.

We claim:

1. An aircraft control system comprising signal combining means for additively combining signals respectively proportional to displacement and rate of change to displacement of said aircraft from a predefined course line and for subtractively combining a signal proportional to aircraft roll attitude, the output from said signal combining means comprising a roll steering command signal, and means for further combining with said roll attitude signal a further signal of predetermined sense and proportional to lateral acceleration of the aircraft about a lateral body axis of said craft passing substantially through the center of gravity of said craft.

2. A control system as defined in claim 1 wherein said lateral acceleration signal comprises the output from a lateral accelerometer fixed to the body axis of the craft.

3. A control system as defined in claim 2 further comprising low pass filtering means through which said lateral accelerometer signal is passed prior to application to said combining means.

4. A control system as defined in claim 2 further comprising means for developing a yaw steering command signal proportional to the existing aircraft crab angle at experienced aircraft altitudes beneath a predetermined altitude, and aircraft yaw axis control means responsive to said yaw steering command signal to effect a lateral acceleration of said aircraft to produce a proportional sensed output signal from said lateral accelerometer.

5. A control system as defined in claim 4 further comprising means for damping said yaw steering command signal with a signal proportional to the time rate of change of said aircraft crab angle.

6. A control system as defined in claim 5 wherein said yaw steering command signal developing means comprises a further signal combining means receiving a first input signal proportional to the aircraft course datum signal defined as the difference between a preselected aircraft heading and the instantaneously experienced aircraft heading and a second input signal proportional to the time rate of change of said course datum signal.

7. A control system as defined in claim 6 comprising low pass filtering means through which said yaw steering command signal is passed to said aircraft yaw axis control means.

8. A control system as defined in claim 6 comprising a signal switching means through which said yaw steering command signal is selectively applied to said aircraft yaw axis control means, and means for closing said switching means when the altitude of said aircraft is less than said predetermined altitude.

* * * * *

UNITED STATES PATENT OFFICE
CERTIFICATE OF CORRECTION

Patent No. 3,761,691     Dated September 25, 1973

Inventor(s) Elmer L. Schultz and Edwin R. Hattendorf

It is certified that error appears in the above-identified patent and that said Letters Patent are hereby corrected as shown below:

Expression (1), column 2, line 35 should read as follows:

$$a_y = \dot{W} + V(\dot{\beta} + \dot{\psi} + \alpha_0 \dot{\Phi}) - g\Phi$$

Signed and sealed this 29th day of January 1974.

(SEAL)
Attest:

EDWARD M. FLETCHER, JR.    RENE D. TEGTMEYER
Attesting Officer          Acting Commissioner of Patents